2 Sheets—Sheet 1.

JONES & MILLER.

Hulling Clover and other Seeds.

No. 44,431.

Patented Sept. 27, 1864.

Witnesses:
G. Breed
A. Bonne

Inventors:
William Jones
Abraham Miller
by Daniel Breed Atty.

JONES & MILLER.
Hulling Clover and other Seeds.

No. 44,431.

2 Sheets—Sheet 2.

Patented Sept. 27, 1864.

Witnesses:
G. Breed
A. Bowen

Inventors:
William Jones
Abraham Miller
by Daniel Breed Atty

UNITED STATES PATENT OFFICE.

WILLIAM JONES AND ABRAHAM MILLER, OF HAGERSTOWN, MARYLAND.

HULLING CLOVER AND OTHER SEEDS.

Specification forming part of Letters Patent No. 44,431, dated September 27, 1864; antedated September 21, 1864.

*To all whom it may concern:*

Be it known that we, WILLIAM JONES and ABRAHAM MILLER, of Hagerstown, in the county of Washington and State of Maryland, have invented a new and useful Improvement in Clover Thrashers, Separators, Hullers, and Cleaners; and we do hereby declare that the following is a full and exact description thereof, reference being had to the accompanying drawings, and to the letters of reference marked thereon.

Our invention consists of a peculiar arrangement of rake-heads or bars with teeth projecting on both sides, hung upon or operated by cranks or crank-shafts, and thus having both a longitudinal and vertical motion like that of a horizontal connecting-rod uniting two cranks, and also in combining such arrangement of rakes with other devices in order to stem and separate clover-seed at the same time it is thrashed, hulled, and cleaned.

Figure 1:
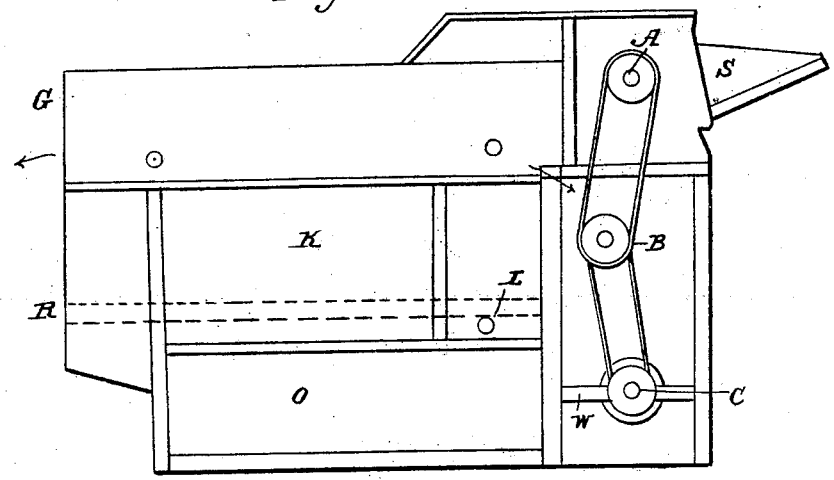
Figure 3:
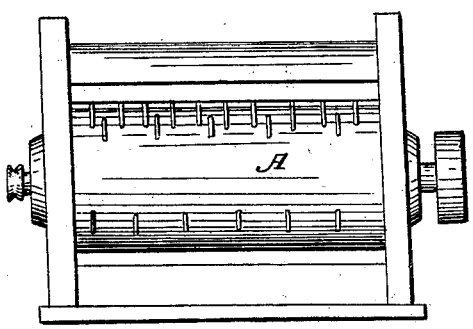
Figure 2:
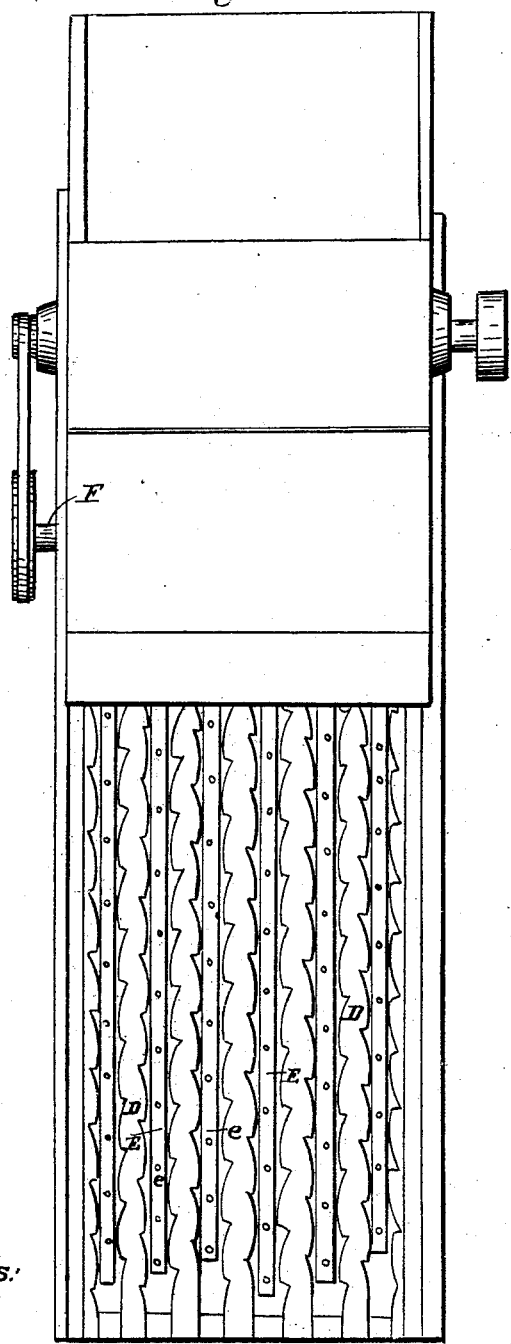
Figure 4:
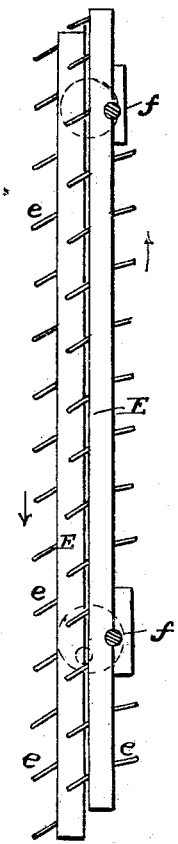

In the accompanying drawings, Figure 1 is a side view of our machine. Fig. 2 is a top view of the same. Fig. 3 is a detached view of the thrashing-cylinder and toothed bed. Fig. 4 is a detached lateral view of two of the rake-heads.

Our machine embraces a thrasher, separator, huller, and cleaner combined. The thrashing-cylinder is placed near the top of the machine, the shaft of the same being seen at A, Fig. 1. This cylinder is spiked in the usual manner and works against a set of opposing spikes or a spiked concave or bed, as seen in Fig. 3.

The clover is fed into the machine by means of the spout S, Fig. 1. From the thrasher the clover passes into the separator. (Figs. 2 and 4.) This separator consists of the stationary notched bars D, and a series of rakes or toothed bars, E, operated by two peculiar crank-shafts, F, Fig. 4. The crank-shaft raises one of the bars E and depresses the next one at the same time, as seen in Fig. 4, the cranks *f* being set spirally around the crank-shaft, so as to operate the bars E successively and not raise or depress any two bars precisely abreast. As the bars E rise they are thrust forward, and as they fall they are carried backward, as seen in Fig. 4. The advance of the upper bar carries forward the straw, as indicated by the upper arrow in Fig. 4, and the backward motion of the lower bar carries the heads and chaff toward the hulling-cylinder B, Fig. 1, as indicated by the arrow in dotted lines.

The above-described motion of the rakes E, with teeth *e* projecting both above and below the bars or rake-heads, in connection with the notched bars D, effectually stems and separates the clover, the seed and heads falling through the series of notched bars and rake-heads, while the straw or stems are carried out of the machine at the arrow G, Figs. 1 and 2.

As the heads and seed pass to the hulling-cylinder B the seed is completely hulled in the usual manner, and then falls from the huller upon the screens R, (dotted lines,) where it meets with a blast of wind from the fans W on the shaft T. The screens are operated by the crank-shaft L in the usual manner. The cleaned seed fall from box K into the lower box O.

We do not broadly claim the use of a combined thrasher, separator, huller, and winnower, but confine our claims to the peculiar construction and arrangement above described.

Having thus described our invention, what we claim, and desire to secure by Letters Patent of the United States, is—

1. The series of rakes D, bars E, provided with teeth *e*, projecting above and below, in combination with the crank-shafts F and notched bars D, substantially in the manner and for the purposes set forth.

2. The above-described separator, in combination with the thrasher, huller, and cleaner, substantially as specified.

WILLIAM JONES.
ABRAHAM MILLER.

Witnesses:
 A. HUPPER,
 JOHN WACHTEL.